(12) United States Patent
Lui et al.

(10) Patent No.: US 6,278,944 B1
(45) Date of Patent: Aug. 21, 2001

(54) NAVIGATION SYSTEM

(75) Inventors: Langtao Lui, Singapore (SG); Wamadeva Balachandran, Uxbridge (GB)

(73) Assignee: Brunel University (GB)

( * ) Notice: Subject to any disclaimer, the term of this patent is extended or adjusted under 35 U.S.C. 154(b) by 0 days.

(21) Appl. No.: 09/230,472
(22) PCT Filed: Jul. 28, 1997
(86) PCT No.: PCT/GB97/02024
  § 371 Date: Oct. 12, 1999
  § 102(e) Date: Oct. 12, 1999
(87) PCT Pub. No.: WO98/04885
  PCT Pub. Date: Feb. 5, 1998

(30) Foreign Application Priority Data

Jul. 26, 1996 (GB) .................................................. 9615771

(51) Int. Cl.[7] .................................. G01S 5/14; H04Q 7/38
(52) U.S. Cl. ............................ 701/215; 342/357; 434/112; 340/995; 340/988; 340/990; 701/202; 701/209
(58) Field of Search ....................... 701/215; 340/825.19; 434/365; 342/450

(56) References Cited

U.S. PATENT DOCUMENTS

| | | | |
|---|---|---|---|
| 5,406,491 | * | 4/1995 | Lima .................................... 701/207 |
| 5,470,233 | * | 11/1995 | Fruchterman et al. .............. 434/112 |
| 5,638,078 | * | 6/1997 | Wichtel ................................ 342/450 |
| 5,903,228 | * | 5/1999 | Ohgaki et al. ....................... 340/995 |
| 6,064,336 | * | 5/2000 | Krasner ........................... 342/357.05 |

FOREIGN PATENT DOCUMENTS

PCT/GB95/
02065   3/1996 (WO) .

* cited by examiner

Primary Examiner—William A. Cuchlinski, Jr.
Assistant Examiner—Tuan C To
(74) Attorney, Agent, or Firm—Craig A. Fieschko, Esq.; DeWitt Ross & Stevens S.C.

(57) ABSTRACT

A navigation system, used for example to navigate visually handicapped people, uses a satellite system such as the GPS system to locate the user via a user held receiver (14). A two-way communication system such as a digital telephone (18) communicates with a central service center (10) at which the user's exact location and navigational information can be determined. There is preferably provided a human-to-human information interface (30). The use of a two-way communication system (18) enables some of the components (20–30) to be kept at a remote and stationary base station (10).

21 Claims, 1 Drawing Sheet

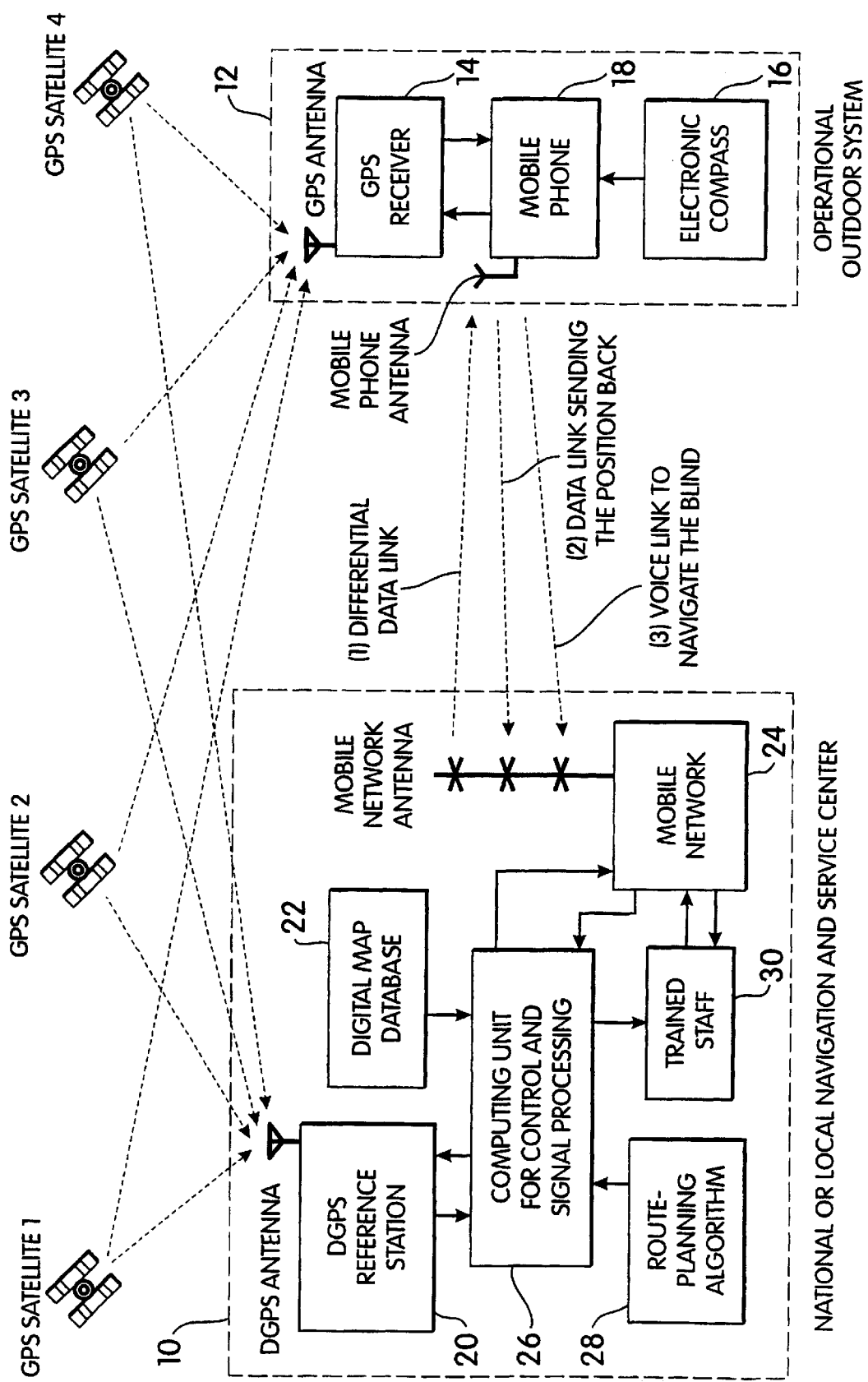

NAVIGATION SYSTEM

The present invention relates to a navigation system for the visually impaired.

BACKGROUND OF THE INVENTION

Although the visually impaired normally become very adept at moving around known environments, including outdoors, difficulties arise when the person is in an unfamiliar environment. The reason for this is that there is much environmental information which can only be discerned visually and which gives little or no information via other senses such as hearing or smell. Although this information can to a certain extent be learned for a familiar environment, it is of no assistance in an unfamiliar environment.

A system being developed to provide navigation for the visually impaired includes a satellite Global Positioning System (GPS) and a digital map specially adapted for visually impaired users. The system includes a first receiver for receiving a signal for the known GPS satellites, a second receiver for receiving a differential GPS (DGPS) correction signal from a fixed base station; a computer for calculating the user's position, for correlating this position with the digital map and for determining environmental obstacles and directions for the user; and a user interface, typically a voice synthesizer.

The GPS satellite system only provides a Standard Positioning resolution of around 100 meters. The differential correction signal is thus provided to increase resolution to around 1 to 5 meters.

With this system, the user must carry all the above components, which can be onerous.

SUMMARY OF THE INVENTION

The present invention seeks to provide an improved navigation system.

According to an aspect of the present invention, there is provided a navigation system including a GPS receiver for receiving positional information from a satellite system; a differential correction unit for determining a differential correction related to the received positional information; a digital map for providing navigational information, a user interface for indicating the positional and/or directional information to the user; and a portable two-way communication system; wherein at least one of the differential correction unit, the digital map and the user interface are locatable remote from the user and in communication with the user by means of the two-way communication system.

The use of a two-way communication system enables some of the equipment otherwise carried by the user to be located elsewhere, such as at a stationary base, thereby reducing the amount of equipment to be carried by the user.

Preferably, each of the differential correction unit, the digital map and the user interface are locatable remote from the user. These normally constitute physically large and expensive components.

It is also envisaged that the components not carried by the user will be located at a remote station which acts as a multi-user base station for a plurality of users. In this way, cost savings and more sophisticated systems can be provided for each user. For example, by locating the digital map in a multi-user base station, a plurality of users can use the same digital map, thereby sharing the expense of such a map. In this manner, a large number of digital maps can be provided, each accessible by the users.

The part of the system which must be carried by each user can be reduced, in the preferred embodiment, to a hand-held or pocket sized unit.

Preferably, the two-way communication system includes a mobile telephone. This is preferably a digital telephone to provide a communication link for the digital information which would typically pass from the user to the remote location. It will be apparent that with the use of a portable telephone it would only be necessary to provide a GPS receiver, which can be sufficiently small to fit within the casing of a portable telephone.

In the preferred embodiment, all data including correction data is transferred by means of a cellular telephone network or other cellular network. The differential correction unit may be located at a cellular network base station.

The portable telephone provides another important advantage, namely a voice-based communication system for the user interface. The preferred embodiment provides for a human-to-human interface, that is for guidance for the visually handicapped user to be by a human, possibly at the multi-user base station. Alternatively, the interface could be by synthesized voice or a combination of synthesized and human communication.

The portable communication system will typically provide for coded activation of the facility by the visually handicapped user. This may be by way of a personal identification number or password or the like.

According to another aspect of the present invention, there is provided a method of navigating a person including the steps of receiving positional information of the person from a satellite system; determining a differential correction related to the received positional information; providing positional and directional information; providing a user interface; and indicating the positional and/or directional information to the person; wherein at least one of the steps of determining a differential correction, providing positional and directional information and providing a user interface are carried out remote from the person.

Preferably, the step of determining a differential correction is carried out before the step of receiving positional information.

The step of providing a user interface preferably includes the step of providing a human-to-human interface.

DESCRIPTION OF THE DRAWING

An embodiment of the present invention is described below, by way of illustration only, with reference to the accompanying drawing, in which the sole FIGURE is a schematic diagram of a preferred embodiment of navigation system.

DESCRIPTION OF THE PREFERRED EMBODIMENT

Referring to the FIGURE, the system shown provides position and navigation information to a user, typically a visually impaired person. The system is based on the known GPS satellite positioning system, in which at present 24 satellites orbit the earth and are able to provide constant signals from at least some of the satellites. The satellite signals are processed to give an indication of position. As is known, the GPS satellite system provides a positional resolution of only around 100 meters.

Improved resolution is provided by means of a differential correction which is obtained via a second GPS receiver located at a fixed and known position. The difference between the perceived position of the fixed GPS receiver as obtained from the GPS satellites and its known position can therefore be calculated in ranges. This difference or differential correction can the be used to "correct" the perceived position of a mobile GPS receiver located proximate the second GPS receiver. Differential correction of this type can generally provide a positional resolution of 1 to 5 meters.

As will be apparent from the Figure, the preferred system includes a fixed base station 10 and a mobile unit 12. The mobile unit 12 includes all of the components which are carried by the visually handicapped person, as will become apparent below. The base station 10 is a multi-user base station and may either be one of several base stations within the operating area of the system (for example, the country) or may be a single base station able to provide all of the required information and services for the whole operating area.

The mobile unit 12 includes a GPS receiver 14 able to at least receive the positioning signals from the GPS satellites 1 to 4 in range. An electronic compass 16 is preferably also provided to give an indication of orientation of the person. For this purpose, the compass 16 may either be located in the casing of the mobile unit 12 or may be locatable separately on the person, in an orientation which is constant relative to the person thereby to provide a constant orientation signal irrespective of the orientation of the mobile unit casing.

A two-way communication system 18 is coupled to the GPS receiver 14 and is operative to send and receive signals transmitted between the mobile unit 12 and the fixed base station 10, in a manner described in detail below. In the example shown, the two-way communication system is a mobile telephone able to transmit and receive the required information over a conventional mobile telephone cellular network. For this purpose, it is preferable to use a mobile telephone which can provide both digital and analogue signals.

Any other cellular network may be used, as may be provided from time to time.

Both the GPS receiver 14 and the electronic compass 16 can be of a relatively small size and in particular of a size by which they can fit within the case of a mobile telephone or within a small extension thereto. Thus, the user can have an easily portable system. As explained above, the electronic compass 16 may be located elsewhere on the user so may not need to be incorporated into the case of the mobile telephone. It is also envisaged in some embodiments that some other or additional user interface may be provided, such as a separate ear piece or other system.

The fixed base station 10 includes a differential GPS (DGPS) reference station 20. As the position of the fixed base station 10 is known, the DGPS reference station 20 is able to determine the positional error between its known position and the position indicated by the GPS satellites in ranges. This positional error forms the differential correction used for the mobile unit 12.

A digital map database 22 in the base station 10 includes a plurality of digital maps specially enhanced for visually handicapped users. These maps thus include additional information such as location of retail units, obstacles and the like which can normally only be discerned visually. The area covered by the digital map database 22 depends on the operating area covered by the base station 10. For example, where the base station 10 is one of a plurality of base stations covering the whole operating area of the system, it will preferably include only the digital maps covering that area. On the other hand, where a single base station is provided, the database 22 will include all the digital maps.

Communication to and from the base station 10 is provided by a two-way communications unit 24, in this case a unit able to communicate with the relevant mobile telephone network.

A central processing unit 26 is coupled to the DGPS reference station 20, to the digital map database 22 and to the communication unit 24. The processing unit 26 can be of any suitable type, as will be readily apparent to the skilled person.

A route planning algorithm 28 is provided with the processing unit 26 to plan the route desired by a user on the basis of the user's position and desired destination, and the relevant digital map obtained from the database 22.

Control of the base station and, in the preferred embodiment, the user interface, is provided by a team of trained staff 30.

In use, the visually handicapped person travels carrying the mobile unit 12. The unit 12 is activated by logging on to the base station 10, typically by dialing a specific telephone number which accesses the base station 10. Once activated, two-way communication is established between the mobile unit 12 and the base station 10.

When activated, the GPS receiver 14 receives continuously the positioning signals from the GPS satellites in range. These signals locate the person with a resolution of 100 meters. In this mode, the mobile unit 12 also receives from the fixed base station 10 the differential correction signal. The GPS receiver 14 is, in this example, equipped with processing means able to determine from the received satellite signal and the differential correction the position of the user, with a resolution of around 1 to 5 meters. The resultant GPS position signal is then sent to the base station, with appropriate user identification data, via the mobile telephone 18.

In addition to sending the GPS position, the mobile unit 12 also provides for input via a suitable means, for example, as a key pad/tactile display (not shown) or spoken request by the user, of the user's desired destination. This signal is also sent to the base station 10.

In an alternative embodiment, the processing unit 26 receives only the raw GPS position signal in range from the mobile unit 12 and itself calculates the position for the user by means of the differential correction determined by the DGPS reference station 20 and finally gets the user's position with resolutions of about 1–5 meters. In this alternative, there is no need to send to the mobile unit 12 the differential correction signal.

The differential position is preferably in RTCM-104 standard.

Thus, the base station 10 becomes equipped with the user's precise position, together with the user's desired destination. By use of the appropriate digital map from the database 22 and of the route planning algorithm 28, the processing unit 26 determines the best route and directions for the user. In the preferred embodiment, this information is given to trained staff, for example on a computer monitor (not shown), who then personally guide the user by talking to the user over the mobile telephone system. Alternatively or additionally, the processing unit 26 generates guidance instructions and sends these to the user over the mobile telephone system as voice synthesized commands. In this alternative, computer generated guidance may be used in simple situations and human assistance provided in periods of difficulty.

In cases where a human interface is provided, the user may indicate the desired destination by voice contact with a member of staff at the base station 10, thereby further facilitating use of the system.

It will be apparent that in the preferred embodiment the mobile telephone 18 provides three types of information link:

1) It works as a differential GPS correction data link

This means that, on the user's side, there is a GPS receiver, and at the Navigation Centre, there is a DGPS reference station. When the GPS receiver is turned on, it receives the differential GPS correction message provided by the Centre through the digital mobile phone link, so that the DGPS function can be realised.

2) It works as a data link to send the blind pedestrian's current position back to the Navigation Centre Once the blind user's position is found by the GPS receiver, this position is then sent back by the mobile phone to the Navigation Centre. At the centre, the necessary signal processing is carried on by the central computer, and a suitable digital map is linked and the necessary navigation information is shown in the screen.

3) It works as audio link from the centre navigation staff to the blind

This is the final stage to navigate the user to the desired destination. This is preferably done by conversations between the centre navigation staff and the user. In other words, the mobile phone is now used as a Human-Human interface. By using this method, the Human-System interface problem especially for the blind, which has troubled researchers for decades is avoided.

Advantages of the preferred system include the ability to reduce the amount of equipment to be carried by the user, to a unit which is easily portable. Moreover, the base station 10 can be a multi-user station, thereby sharing costs for the user and allowing for more facilities, such as an increased number of digital maps. The user interface can provide a human element to the guidance, which is considered to be preferable over purely automated systems.

It will be apparent that other embodiments may locate one or more of the parts of the base station 12 on the user or at another location, in dependence upon commercial and practical considerations.

The disclosures in British patent application number 9615771.4, from which this application claims priority, and in the abstract accompanying this application are incorporated herein by reference.

What is claimed is:

1. A navigation system including:
   a. GPS receivers for receiving positional information from a satellite system;
   b. at least one differential correction unit for determining a differential correction related to the received positional information;
   c. a digital map for providing navigational information,
   d. a user interface for indicating the positional and/or directional information to the user, the user interface including a human-to-human interface; and
   e. a portable two-way communication system;
   wherein at least one of the differential correction unit, the digital map and the user interface are loadable remote from the user and in communication with the user by means of the two-way communication system.

2. A system according to claim 1, wherein each of the differential correction unit, the digital map and the user interface are locatable remote from the user.

3. A system according to claim 1, wherein the part or parts which are carriable by the user are housed in a hand-held or pocket sized unit.

4. A system according to claim 1, wherein the communication system is designed to operate via a cellular network.

5. A system according to claim 4, wherein the two-way communication system includes a mobile telephone.

6. A system according to claim 5, wherein the telephone is a digital telephone.

7. A system according to claim 2, wherein the part or parts which are carriable by the user are housed in a hand-held or pocket sized unit.

8. A system according to claim 2, wherein the communication system is designed to operate via a cellular network.

9. A system according to claim 3, wherein the communication system is designed to operate via a cellular network.

10. A system according to claim 2, wherein the two-way communication system includes a mobile telephone.

11. A system according to claim 3, wherein the two-way communication system includes a mobile telephone.

12. A method of navigating a person including the steps of:
    a. receiving positional information of the person from a satellite system;
    b. determining a differential correction related to the received positional information;
    c. providing positional and directional information;
    d. providing a user interface, wherein the user interface includes a human-to-human interface; and
    e. indicating the positional and/or directional information to the person;
    wherein at least one of the steps of determining a differential correction, providing positional and directional information and providing a user interface are carried out remote from the person.

13. A method according to claim 12, wherein the step of determining a differential correction is carried out at a DGPS reference station.

14. A method according to claim 13, wherein communication is carried out over a cellular network.

15. A method according to claim 12, wherein the step of determining a differential correction is carried out before the step of receiving positional information.

16. A method according to claim 15, wherein communication is carried out over a cellular network.

17. A method according to claim 12, wherein communication is carried out over a cellular network.

18. A navigation system including;
    a. GPS receivers which receive positional information from a satellite system;
    b. at least one differential correction unit which determines a differential correction related to the received positional information;
    c. a digital map containing navigational information,
    d. a user interface for indicating the positional and/or directional information to the user; and
    e. a portable two-way communication system;
    wherein the differential correction unit is loadable remote from the user and in communication with the user by means of the two-way communication system.

19. The navigation system of claim 18 wherein the user interface includes a human-to-human interface.

20. The navigation system of claim 18 wherein the user interface includes a synthetic voice-to-human interface.

21. The navigation system of claim 18 wherein at least one of the digital map and the user interface is also loadable remote from the user and in communication with the user by means of the two-way communication system.

* * * * *